(12) United States Patent
Hahn et al.

(10) Patent No.: US 10,496,608 B2
(45) Date of Patent: Dec. 3, 2019

(54) SYNCHRONIZING CHANGES IN A FILE SYSTEM WHICH ARE INITIATED BY A STORAGE DEVICE AND A HOST DEVICE

(75) Inventors: Judah Gamliel Hahn, Ofra (IL); Alain Nochimowski, Tel-Aviv (IL); Micha Rave, Herzlia (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 12/607,551

(22) Filed: Oct. 28, 2009

(65) Prior Publication Data

US 2011/0099212 A1   Apr. 28, 2011

(51) Int. Cl.
*G06F 16/00* (2019.01)
*G06F 16/178* (2019.01)

(52) U.S. Cl.
CPC .................. *G06F 16/178* (2019.01)

(58) Field of Classification Search
CPC ...... G06F 16/10; G06F 16/122; G06F 16/178; G06F 16/182; G06F 16/245; G06F 16/275; G06F 16/1727; G06F 16/1847; G06F 16/22; G06F 16/23; G06F 16/27
USPC ......................... 707/610, 822, 827
See application file for complete search history.

(56) References Cited

U.S. PATENT DOCUMENTS

| | | | | |
|---|---|---|---|---|
| 5,170,466 A | * | 12/1992 | Rogan ...................... | G06F 16/58 715/255 |
| 5,301,350 A | * | 4/1994 | Rogan ...................... | G06F 16/58 705/33 |
| 5,321,816 A | * | 6/1994 | Rogan ................... | G06Q 20/108 705/42 |
| 5,544,347 A | * | 8/1996 | Yanai ..................... | G06F 3/0601 711/162 |
| 5,813,016 A | * | 9/1998 | Sumimoto ........... | G06F 16/1767 707/999.201 |
| 5,889,935 A | * | 3/1999 | Ofek .................... | G06F 11/2066 709/217 |
| 6,029,231 A | * | 2/2000 | Blumenau ............. | G06F 3/0617 709/217 |
| 6,247,099 B1 | * | 6/2001 | Skazinski ........... | G06F 12/0815 711/117 |
| 6,401,093 B1 | * | 6/2002 | Anand .................. | G06F 9/4416 707/999.202 |
| 6,460,123 B1 | * | 10/2002 | Blumenau ........... | G06F 11/2071 709/203 |
| 6,499,039 B1 | * | 12/2002 | Venkatesh ............. | G06F 3/0607 707/999.204 |
| 6,601,187 B1 | * | 7/2003 | Sicola ................. | G06F 11/2071 711/162 |

(Continued)

OTHER PUBLICATIONS

"Controlled Data Access to Non-Volatile Memory," U.S. Appl. No. 12/336,445, Inventors: Fabrice Jogand-Coulomb, Robert Chang, Po Yuan, Mei Yan, and Xian Jun Liu; filed Dec. 16, 2008.

(Continued)

*Primary Examiner* — Mark E Hershley
*Assistant Examiner* — Rezwanul Mahmood
(74) *Attorney, Agent, or Firm* — Brinks Gilson & Lione (57) ABSTRACT

A storage device initiates a change in its file system and locally stores it for future updates of the file system. The host device sends a command to the storage device and the storage device responds by commencing a synchronization process during which the two parties coordinate the update of the file system with the stored change.

20 Claims, 4 Drawing Sheets

(56) References Cited

U.S. PATENT DOCUMENTS

| | | | | |
|---|---|---|---|---|
| 6,629,264 B1* | 9/2003 | Sicola | G06F 11/2007 | 714/15 |
| 6,643,795 B1* | 11/2003 | Sicola | G06F 11/2069 | 714/11 |
| 6,658,540 B1* | 12/2003 | Sicola | G06F 11/2007 | 707/999.202 |
| 6,658,590 B1* | 12/2003 | Sicola | G06F 11/1471 | 714/15 |
| 6,665,780 B1* | 12/2003 | Bradley | G06F 11/2058 | 711/112 |
| 6,697,895 B1* | 2/2004 | Sherritt | G06F 3/0605 | 709/200 |
| 6,823,398 B1* | 11/2004 | Lee | G06F 3/0622 | 710/5 |
| 6,883,114 B2* | 4/2005 | Lasser | G06F 11/1435 | 714/19 |
| 6,996,670 B2* | 2/2006 | Delaire | G06F 3/0601 | 711/114 |
| 7,051,054 B1* | 5/2006 | Lee | G06F 3/0607 | 707/999.202 |
| 7,089,549 B2* | 8/2006 | Venkiteswaran | G06F 9/4408 | 717/170 |
| 7,111,189 B1* | 9/2006 | Sicola | G06F 11/2092 | 714/15 |
| 7,158,985 B1* | 1/2007 | Liskov | G06F 11/2097 | 707/999.101 |
| 7,177,935 B2* | 2/2007 | Bradshaw | H04L 41/0893 | 709/226 |
| 7,240,238 B2* | 7/2007 | Yanai | G06F 3/0601 | 714/6.32 |
| 7,287,063 B2 | 10/2007 | Baldwin et al. | | |
| 7,307,948 B2* | 12/2007 | Infante | G06F 3/0613 | 370/225 |
| 7,523,252 B2* | 4/2009 | Honma | G06F 3/0607 | 702/127 |
| 7,603,530 B1* | 10/2009 | Liikanen | G06F 11/2084 | 711/156 |
| 7,617,358 B1* | 11/2009 | Liikanen | G11B 5/02 | 360/78.08 |
| 7,620,772 B1* | 11/2009 | Liikanen | G11B 27/322 | 711/112 |
| 7,653,847 B1* | 1/2010 | Liikanen | G01R 33/1207 | 360/31 |
| 7,685,360 B1* | 3/2010 | Brunnett | G06F 3/0608 | 360/31 |
| 7,710,912 B1* | 5/2010 | Myles | G06F 8/61 | 370/310 |
| 7,752,491 B1* | 7/2010 | Liikanen | G06F 11/2087 | 714/6.13 |
| 7,774,391 B1* | 8/2010 | Le | G06F 16/13 | 707/822 |
| 7,853,565 B1* | 12/2010 | Liskov | G06F 11/2097 | 705/53 |
| 7,916,421 B1* | 3/2011 | Liikanen | G11B 19/045 | 360/77.01 |
| 7,937,617 B1* | 5/2011 | Nagineni | G06F 11/2092 | 714/13 |
| 8,583,878 B2* | 11/2013 | Nochimowski | G06F 12/0806 | 709/216 |
| 8,886,597 B2* | 11/2014 | Hahn | G06F 16/1847 | 707/613 |
| 8,924,656 B1* | 12/2014 | Usgaonkar | G06F 3/0614 | 711/103 |
| 9,137,249 B2* | 9/2015 | Mosek | H04L 67/2819 | |
| 2002/0156798 A1* | 10/2002 | Larue | G06F 16/27 | 707/999.201 |
| 2002/0162012 A1 | 10/2002 | Burnett et al. | | |
| 2003/0149695 A1* | 8/2003 | Delaire | G06F 16/1824 | 707/999.01 |
| 2003/0149770 A1* | 8/2003 | Delaire | G06F 3/0601 | 709/226 |
| 2003/0167419 A1* | 9/2003 | Yanai | G06F 3/0601 | 714/6.31 |
| 2003/0182422 A1* | 9/2003 | Bradshaw | H04L 41/0893 | 709/225 |
| 2003/0237016 A1* | 12/2003 | Johnson | G06Q 10/10 | 714/4.1 |
| 2004/0024795 A1* | 2/2004 | Hind | G06F 16/275 | 707/999.204 |
| 2004/0073567 A1* | 4/2004 | Pelon | G06F 16/27 | 707/999.102 |
| 2004/0117580 A1 | 6/2004 | Wu et al. | | |
| 2004/0117804 A1* | 6/2004 | Scahill | G06F 9/542 | 719/320 |
| 2004/0158698 A1 | 8/2004 | Rothman et al. | | |
| 2004/0193625 A1* | 9/2004 | Sutoh | G06F 11/1471 | 707/999.1 |
| 2005/0015663 A1* | 1/2005 | Armangau | G06F 11/2074 | 714/15 |
| 2005/0071585 A1* | 3/2005 | Hayardeny | G06F 11/2074 | 711/162 |
| 2005/0076262 A1* | 4/2005 | Rowan | G06F 11/1469 | 714/6.2 |
| 2005/0099963 A1* | 5/2005 | Multer | G06F 16/178 | 370/254 |
| 2005/0125495 A1* | 6/2005 | Tjong | H04L 12/4633 | 709/203 |
| 2005/0177571 A1* | 8/2005 | Adams | G06F 16/10 | 707/999.01 |
| 2005/0210218 A1* | 9/2005 | Hoogterp | G06F 3/0613 | 711/203 |
| 2005/0289521 A1* | 12/2005 | Lin | G06F 13/102 | 717/138 |
| 2006/0005074 A1* | 1/2006 | Yanai | G06F 3/0601 | 714/6.32 |
| 2006/0015676 A1 | 1/2006 | Oribe et al. | | |
| 2006/0080359 A1 | 4/2006 | Powell et al. | | |
| 2006/0112150 A1* | 5/2006 | Brown | G06F 16/1787 | 707/999.201 |
| 2006/0112219 A1* | 5/2006 | Chawla | G06F 3/0607 | 711/114 |
| 2006/0212623 A1* | 9/2006 | Honma | G06F 3/0607 | 710/62 |
| 2006/0218643 A1 | 9/2006 | DeYoung | | |
| 2007/0088737 A1* | 4/2007 | Kawakami | G06F 21/50 | 707/999.102 |
| 2007/0233775 A1* | 10/2007 | Jackson | G06F 9/545 | 709/201 |
| 2007/0276949 A1* | 11/2007 | Mergi | H04L 67/1095 | 709/228 |
| 2008/0052776 A1* | 2/2008 | Prabhat | H04L 63/08 | 726/15 |
| 2008/0082558 A1* | 4/2008 | Uno | H04L 67/06 | 707/999.1 |
| 2008/0086614 A1 | 4/2008 | Canis et al. | | |
| 2008/0104591 A1* | 5/2008 | McCrory | G06F 9/45558 | 718/1 |
| 2008/0140969 A1* | 6/2008 | Lawrence | G06F 3/0605 | 711/163 |
| 2008/0195759 A1* | 8/2008 | Novik | H04L 29/06 | 709/248 |
| 2008/0263083 A1* | 10/2008 | Coronado | G06F 3/0607 | 707/999.102 |
| 2009/0024665 A1* | 1/2009 | Morita | G06F 9/45512 | 707/999.1 |
| 2009/0083338 A1* | 3/2009 | Evans | H04L 51/04 | 707/999.201 |
| 2009/0089614 A1* | 4/2009 | Eguchi | G06F 11/142 | 714/15 |
| 2009/0125547 A1* | 5/2009 | Kawakami | G06F 21/50 | 707/999.102 |
| 2009/0144477 A1* | 6/2009 | Chen | G06F 13/385 | 710/302 |
| 2009/0172050 A1* | 7/2009 | Nochimowski | G06F 3/0607 | 707/999.205 |
| 2009/0172217 A1* | 7/2009 | Nochimowski | G06F 3/0607 | 710/38 |

(56) References Cited

U.S. PATENT DOCUMENTS

| | | | |
|---|---|---|---|
| 2009/0198772 A1* | 8/2009 | Kim | H04L 67/1095 709/203 |
| 2009/0228823 A1* | 9/2009 | Edwards | G06F 3/0605 715/772 |
| 2009/0259798 A1* | 10/2009 | Wang | G06F 3/0607 711/103 |
| 2009/0307452 A1* | 12/2009 | Hahn | G06F 21/57 711/164 |
| 2010/0005225 A1* | 1/2010 | Honda | G06F 3/0607 711/103 |
| 2010/0011351 A1* | 1/2010 | Tsvi | G06F 3/0607 717/174 |
| 2010/0023721 A1 | 1/2010 | Ito | |
| 2010/0057992 A1* | 3/2010 | Hahn | G06F 3/0613 711/115 |
| 2010/0064292 A1* | 3/2010 | Akutsu | G06F 3/0605 718/104 |
| 2010/0070595 A1* | 3/2010 | Park | H04L 67/2823 709/206 |
| 2010/0082711 A1* | 4/2010 | Herman | G06F 16/10 707/816 |
| 2010/0122047 A1 | 5/2010 | Vasilievna et al. | |
| 2010/0153338 A1* | 6/2010 | Ngo | G06F 3/061 707/610 |
| 2010/0153553 A1* | 6/2010 | Sheth | H04L 67/1095 709/226 |
| 2010/0169395 A1* | 7/2010 | Bryant-Rich | G06F 3/0605 707/831 |
| 2010/0228799 A1* | 9/2010 | Hutton | G06F 3/0607 707/822 |
| 2010/0235329 A1* | 9/2010 | Koren | H04L 67/2847 707/687 |
| 2010/0235473 A1* | 9/2010 | Koren | H04L 67/2847 709/219 |
| 2010/0241656 A1* | 9/2010 | Iwasaki | G06F 3/0614 707/769 |
| 2010/0262677 A1* | 10/2010 | Mergi | H04L 67/1095 709/219 |
| 2010/0306417 A1* | 12/2010 | Stephens | G06F 13/1631 710/5 |
| 2011/0047195 A1* | 2/2011 | Le | G06F 16/13 707/827 |
| 2011/0047347 A1* | 2/2011 | Li | G06F 12/0246 711/209 |
| 2011/0099145 A1* | 4/2011 | Hahn | G06F 16/1847 707/613 |
| 2011/0099212 A1* | 4/2011 | Hahn | G06F 16/178 707/822 |
| 2011/0107047 A1* | 5/2011 | Sela | G06F 21/604 711/163 |
| 2011/0119403 A1* | 5/2011 | Ozzie | G06F 16/275 709/248 |
| 2011/0219189 A1* | 9/2011 | Arakawa | G06F 11/2064 711/119 |
| 2011/0225455 A1* | 9/2011 | Eguchi | G06F 11/142 714/15 |
| 2012/0047154 A1* | 2/2012 | Lin | G06F 3/0608 707/756 |

OTHER PUBLICATIONS

"Managing Access to an Address Range in a Storage Device," U.S. Appl. No. 12/338,738, Inventors: Rotem Sela, Michael Holtzman, Ron Barzilai, and Donald Ray Bryant-Rich; filed Oct. 18, 2008.

"Synchronizing Changes in a File System Which are Initiated by a Storage Device and a Host Device," U.S. Appl. No. 12/607,575, Inventors: Judah G. Hahn, Alain Nochimowski, and Micha Rave; filed Oct. 28, 2009.

Office Action for U.S. Appl. No. 12/607,575, dated Oct. 20, 2011, 22 pages.

* cited by examiner

SYNCHRONIZING CHANGES IN A FILE SYSTEM WHICH ARE INITIATED BY A STORAGE DEVICE AND A HOST DEVICE

FIELD OF THE INVENTION

The present invention generally relates to storage devices and host devices and more specifically to a method for synchronizing a file system used by such devices.

BACKGROUND

Storage devices typically include a non-volatile memory ("NVM") for storing various types of data, and a memory controller that manages the NVM. The memory controller performs storage operations on the memory (i.e., writing and reading data, etc.) by using a file system that is stored in the NVM. Conventional memory controllers of NVM-based storage devices can make changes to the file system in response to storage commands that they receive from host devices with which they operate, but they cannot initiate changes in the file system independently of the host device. In order for a host device to be able to operate with a storage device, the host device reads information from the storage device, which allows it to locally use a representation of the storage device file system to read data, write data, etc., that is stored in the storage device.

A host device initiates changes in the file system residing in the storage device, for example, when it writes data into the storage device. A storage device may initiate changes in the file system when it performs internal activities such as logging its own activities, storing secure content that is received through an 'out-of-band' connection (e.g., ASSD, which is an industry standard connection) that is established between the storage device and a network server, automatically discarding consigned content when user-content is written into the memory of the storage device, moving data or files from one memory partition to another, etc.

If a storage device independently makes changes in its file system, the host device does not necessarily recognize these changes and, therefore, it may inadvertently overwrite them. For example, the host device may overwrite these changes when it writes its own changes into the storage device file system. The file system residing in the storage device and the representation of the file system residing in the host device must be synchronized, regardless of which party initiated changes in the file system, in order to prevent file system inconsistencies. If the file system in the storage device and its representation in the host device are not synchronized, the host device and the storage device cannot function properly.

There is therefore a need to address the problem of de-synchronization of the file system and its representation when the storage device initiates changes in the file system. There is also a need to synchronize changes that are initiated by the storage device and changes that are initiated by the host device to ensure that one coherent file system is used by both parties.

SUMMARY

In view of the foregoing, it would be beneficial to have a storage device and a host device that can efficiently synchronize the file system and the view of the file system. Various embodiments are designed to implement the synchronization, examples of which are provided herein.

To address the foregoing (assuming a storage device is capable of initiating changes in the file system), every time the storage device initiates a change in its file system, which is referred to herein as a "storage device file system", it locally stores the change for future update of the storage device file system. When the host device sends a storage command or a storage-related command to the storage device, the storage device executes the command and, thereafter, it commences a synchronization process in which the two parties negotiate and coordinate the update of the storage device file system with the one or more pending changes.

If the host device does not initiate changes in the storage device file system (i.e., there are no pending changes in the host device), the synchronization process includes: updating (by the storage device) the storage device file system in the storage device with the changes initiated by the storage device, and—in response to a corresponding command from the host device—transferring to the host device information regarding the changes (i.e., updates) that were made in the storage device file system, in order for the host device to make these changes in the representation of the file system.

If the host device initiates changes in the storage device file system (i.e., there are pending changes in the host device), the synchronization process includes: updating the representation of the file system in the host device, by the host device, with the pending changes; transferring information to the storage device regarding the changes that the host device made in the representation of the file system in order for them to be written into the storage device file system by the storage device, writing the changes into the storage device file system by the storage; and—in response to a corresponding command from the host device—transferring to the host device information regarding the changes that were made in the storage device file system, in order for the host device to make these changes in the representation of the file system.

BRIEF DESCRIPTION OF THE DRAWINGS

The accompanying drawings, which are incorporated in and constitute part of this specification, illustrate various embodiments with the intent that these examples not be restrictive. It will be appreciated that for simplicity and clarity of the illustration, elements shown in the figures referenced below are not necessarily drawn to scale. Also, where considered appropriate, reference numerals may be repeated among the figures to indicate like, corresponding or analogous elements. Of the accompanying figures.

DETAILED DESCRIPTION

The description that follows provides various details of example embodiments. However, this description is not intended to limit the scope of the claims but instead to explain various principles of the invention and the manner of practicing it.

As explained above, conventional storage devices cannot (i.e., are not designed to) initiate changes in their file system because their file systems are managed by others (i.e., by their hosts). However, such capability may be imparted to storage devices in the future.

Figure 1:
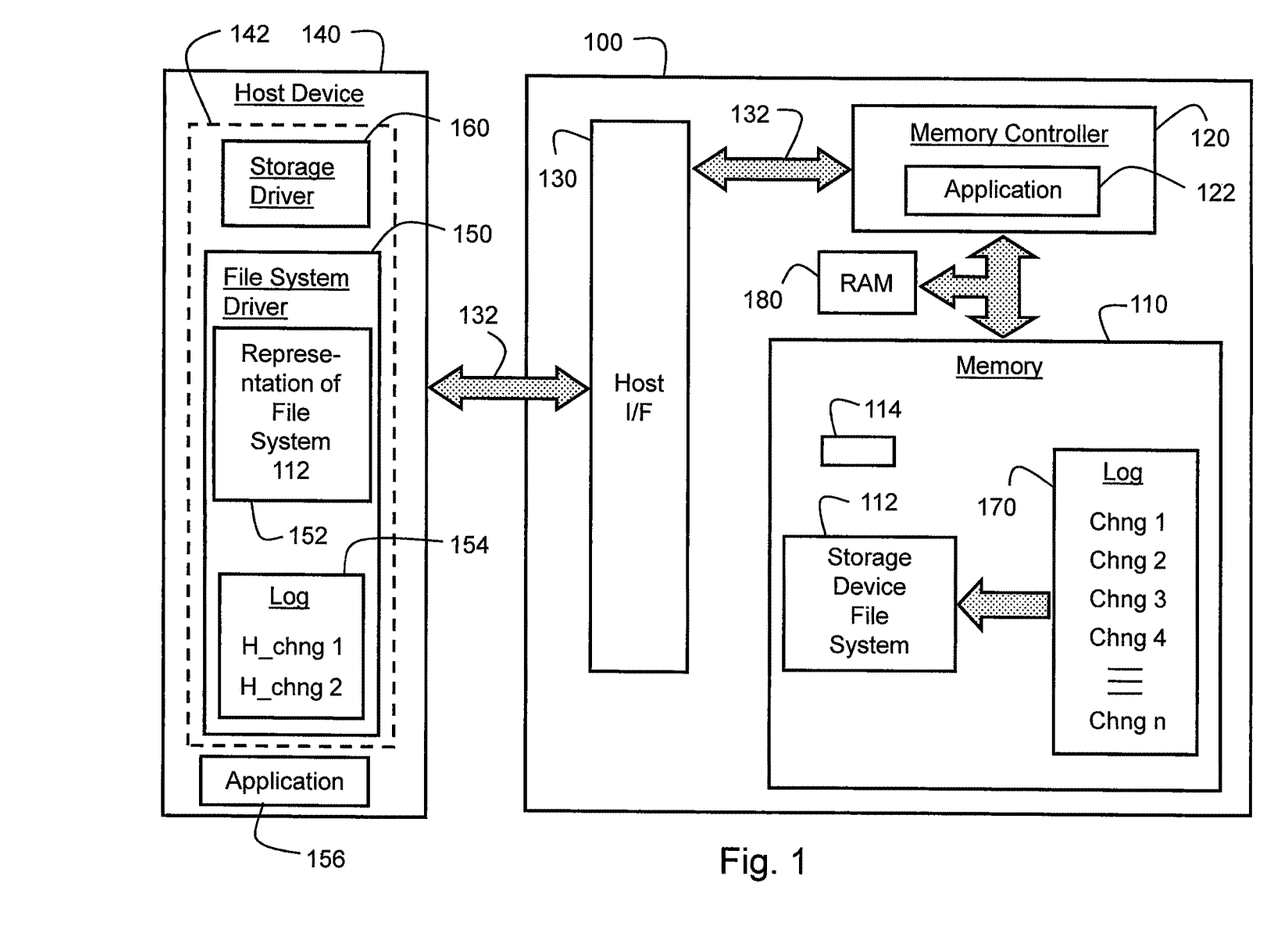
FIG. 1 is a block diagram of a storage device and a host device according to an embodiment.

FIG. 1 is a block diagram of a storage device 100 and a host device 140 according to an embodiment. Storage device 100 includes a memory 110 for storing computer files and a storage device file system 112 that facilitates accessing the stored files. Storage device 100 also includes a memory controller 120 for managing memory 110, and a host interface 130. Host interface 130 enables memory controller 120 to exchange data, information, and commands with a host device 140.

Host device 140 includes a host driver 142. Host driver 142 is functionally divided into a file system driver 150 for managing storage device file system 112, and a storage driver 160 for managing the connection between file system driver 150 (and in general between host device 140) and memory controller 120. Host driver 142 holds a representation of storage device file system 112 that allows it, in conjunction with memory controller 120 of storage device 100, to perform storage operations on memory 110 (e.g., write a file into memory 110, read data from memory 100, etc.). The representation of storage device file system 112 is shown at 152.

Storage device file system 112 and its representation (i.e., file system representation 152) have to be (re-)synchronized every time, or once in while (depending on the interaction between the two parties), the storage device and/or the host device initiates one or more changes in the file system because a file system inconsistency results in operation failure of the devices. Therefore, file system inconsistencies must be avoided. By "file system inconsistency" is meant that the storage device file system is not genuinely represented in the host device, in which case the storage device file system and its representation are unsynchronized. By "synchronizing a file system" is, therefore, meant updating the file system with each change that was made in the representation of the file system, and vice versa.

Conventionally, host driver 142 assumes control of file system 112. This means that whenever host driver 142 wants to make a change in storage device file system 112, it makes the storage while taking into account memory considerations such as the size of the free storage space in memory 110, location of free storage areas in memory 110, etc. Host driver 142 gets the information regarding free storage space(s) after it checks out the representation 152 of storage device file system 112. Performing a storage operation in storage device 100 by host driver 142 entails updating file system representation 152 with corresponding changes and, consequently, updating storage device file system 112.

Memory controller 120 may initiate various types of background operations that entail changes in file system 112 that host driver 142 may not be 'aware of'. Traditionally, in order for host driver 142 to be aware of such changes, host driver 142 has to reread the entire file system 112 from memory 110 in order to update its representation (i.e., representation 152). Other conventional methods for synchronizing storage device file system 112 and its representation in host device 140 (i.e., file system representation 152) would involve resetting host device 140 or storage device 100, or disconnecting the two devices and reconnecting them. These file system synchronization methods are inefficient and, in the event where the two devices are reset or disconnected, data might be corrupted or lost due to the reset or disconnection.

Instead of causing the host device to reread the entire file system, or resetting host device 140 or storage device 100, or disconnecting the two devices and reconnecting them to synchronize the storage device file system and its representation, memory controller 120 defers the changes to be made in file system 112 and, as the changes accumulate, it stores them, on-the-fly, in a log, for example in log 170, in order to make all, or part of them, in the storage device file system at the 'right' time, as explained below. Log 170 is a table that includes an entry for each change. Whenever memory controller 120 has another change to make in file system 112, it creates another entry in log 170. By way of example, log 170 contains n entries for accommodating n pending changes that are designated as "Chng 1", "Chng 2", "Chng 3", "Chng 4", . . . , "Chng n".

Assume that memory controller 120 decides—independently of host device 140—to store a new, 10 megabytes ("MB"), consigned file in memory 110, which entails a change (which is designated hereinafter as "change-X") in file system 112. Logging change-X means adding a new log entry to log 170, and storing information in the new log entry regarding, for example, creation of the file (including the file's creation date), the file name (temporarily or permanently) assigned by memory controller 120 to the new file (e.g., "NEWFILE.DAT"), file attributes of the file, pre-allocation of a 10 MB storage space within memory 110 for the file, writing directives for writing the file into memory 110, etc.

Memory controller 120 may temporarily store the content of the 10 MB file in log 170 or external to it, in memory 110 or in random access memory ("RAM") 180. If memory controller 120 temporarily stores the 10 MB file outside log 170, it stores a pointer in the pertinent entry of log 170, which enables it to locate the file when time comes to write it into memory 110 and to update the file system accordingly. (Note: there is no record in storage device file system 112 for files/data that are temporarily stored in log 170 or elsewhere.) After memory controller 120 makes the change (i.e., after it writes the file into memory 110 and updates file system 112 accordingly), it deletes the file from the storage area that temporarily holds it. Log 170 is held in a storage area (e.g., within memory 110) that is inaccessible to host device 140 in order to prevent the host device from corrupting its content.

If host driver 142 transfers 132 a command to memory controller 120 to perform a storage operation (e.g., reading a data file 114 from storage device 100) and log 170 contains at least one change that is to be made in storage device file system 112, memory controller 120 complies with the command and, then, commences a synchronization process to synchronize between storage device file system 112 and file system representation 152. The synchronization process is elaborated in FIG. 2, which is described below.

Assume that host driver 142 includes a log (i.e., log 154) similar to log 170 of storage device 100, and that log 154 may contain one or more changes, or it may be empty. If host device 140 has pending (i.e., logged) changes that have to be made in file system 112, host driver 142 updates file system representation 152 with the pending changes, and, then, transfers information to memory controller 120 regarding these updates in order for memory controller 120 to update storage device file system 112 with these changes. Situations where host device 140 uses a log such as log 154 are rare. Typically, host driver 142 makes changes to file system representation 152 as it initiates them, without temporarily storing them in a log such as log 154.

By way of example, host driver 150 logs two changes in log 154 (which are designated as "H_chng 1" and "H_chng 2") in order to make them in file system representation 152.

Therefore, before host driver 142 sends to memory controller 120 a corresponding message or command to update file system 112 with the changes logged in log 170 (i.e., "Chng 1", "Chng 2", . . . , "Chng n"), it updates file system representation 152 in host device 140 with the two impending changes "H_chng 1" and "H_chng 2". Then, host driver 142 sends information to memory controller 120 regarding the changes that it recently made in file system representation 152, regardless of whether (the) changes were logged in a log such as log 154 or not. Then, memory controller 120 updates storage device file system 112 with the changes initiated by file system driver 150 (e.g., "H_chng 1" and "H_chng 2"), and, thereafter, with the changes, or some of them, initiated by memory controller 120 and temporarily held in log 170.

Then, storage device 100 notifies host driver 142 that storage device file system 112 is updated with all the changes initiated so far by both parties. Host driver 142 responds to the memory controller's notification by requesting information from memory controller 120 that pertains to the changes that were initiated by memory controller 120, in order to update file system representation 152 with these changes so that file system representation 152 and storage device file system 112 be synchronized.

If memory controller 120 notifies host driver 142 that it has changes to make in storage device file system 112 (i.e., log 170 contains one or more changes) and host driver 142 did not make new changes in file system representation 152 since the last synchronization nor there are pending changes in log 154, host driver 142 sends a corresponding message or command to memory controller 120 to update storage device file system 112 with the changes pending in storage device 100. Then, host driver 142 requests information from memory controller 120 regarding the changes that memory controller 120 made in storage device file system 112, in order to update file system representation 152 with the same changes.

Figure 2:
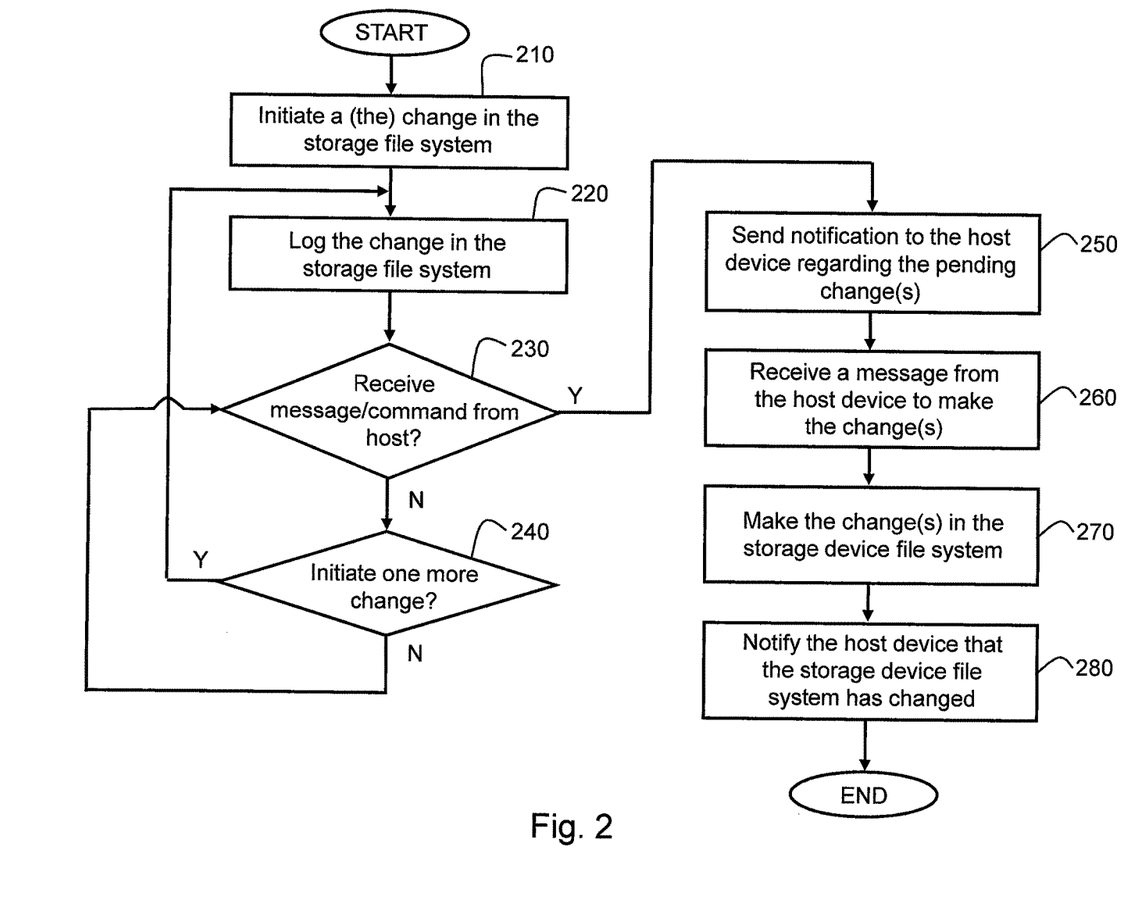
FIG. 2 is a method for updating a storage device file system in a storage device according to an embodiment.

FIG. 2 is a method for updating a storage device file system with changes initiated by a storage device according to an embodiment. FIG. 2 will be described in association with FIG. 1. At step 210, memory controller 120 initiates a change in storage device file system 112. As explained above, changes in the storage device's file system have to be made also in the representation 152 of the storage device file system 112 in order to synchronize them. Traditionally, storage devices, such as storage device 100, react to commands that they receive from host devices such as host device 140 but they do not initiate communications with their host. Therefore, at step 210, rather than immediately notifying host device 140 of the change and/or making the change in storage device file system 112, memory controller 120 stores the change in log 170, at step 220, and waits until host device 140 addresses it (i.e., sends to it a message or command).

At step 230, if memory controller 120 does not receive any message or command from host device 140 (shown as "N" at step 230) and, in addition, at step 240 it does not initiate another change in storage device file system 112 (shown as "N" at step 240), memory controller 120 waits, at step 230, for a host message or command.

At step 230, if memory controller 120 does not receive any message or command from host device 140 (shown as "N" at step 230) and, while waiting for such a message or command, it initiates another change in storage device file system 112 (shown as "Y" at step 240), memory controller 120 stores, at step 220, the additional change in log 170.

If at step 230 memory controller 120 receives a message or command from host device 140 (shown as "Y" at step 230), memory controller 120 sends, at step 250, a notification to host driver 142 regarding the initiated, yet pending, change(s). Contingent on a message or command that memory controller 120 receives from host driver 142 at step 260 to make the change(s), memory controller 120 makes the change(s) in storage device file system 112 at step 270. While memory controller 120 makes a particular change in storage device file system 112, it defers other changes from taking place. In other words, it makes all the changes, or only some of them, one at a time and according to a predefined order, and/or contingent on preceding changes or succeeding changes.

At step 280, memory controller 120 notifies host driver 142 that storage device file system 112 has changed such that representation 152 of storage device file system 112 on host device 140 can be updated with this (or these) change (or changes).

As explained above, host driver 142 may also initiate changes in storage device file system 112. Therefore, if there are changes that host driver 142 schedules to make in storage device file system 112, it makes these changes in file system representation 152 and notifies memory controller 120 of these changes prior to memory controller 120 making its own changes (i.e., the changes logged in log 170), as is more elaborated in FIG. 3, which is described below.

Figure 3:
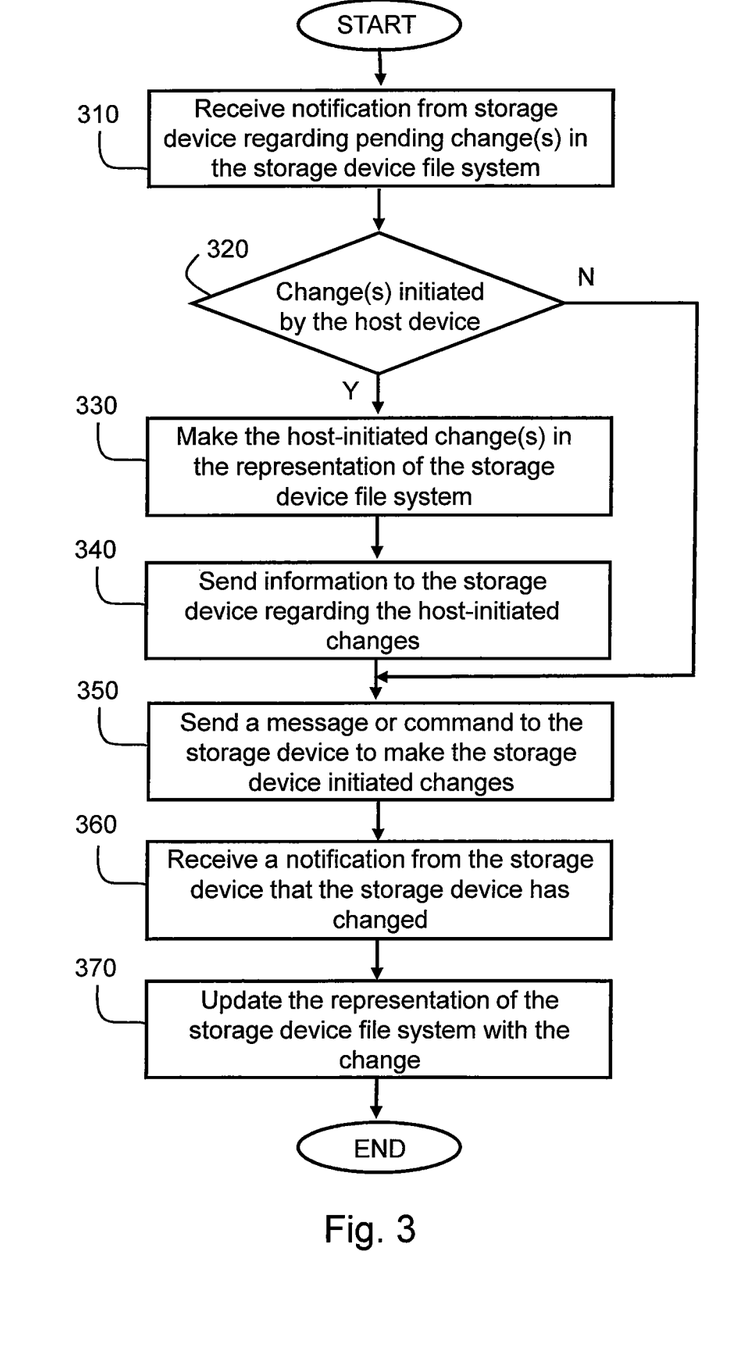
FIG. 3 is a method for synchronizing between a storage device file system in a storage device and a representation thereof in a host device according to an embodiment.

FIG. 3 is a method for synchronizing between a storage device file system in a storage device and a representation thereof in a host device according to an embodiment. FIG. 3 will be described in association with FIG. 1 and FIG. 2. At step 310, host driver 142 receives a notification from memory controller 120 regarding a change, or changes, in storage device file system 112 that memory controller 120 initiates (this step corresponds to step 250 in FIG. 2). Assume that the change(s) initiated by memory controller 120 is/are temporarily stored in log 170. If host driver 142 does not initiate changes of its own in storage device file system 112 (shown as "N" at step 320), then, in response to receiving the notification from memory controller 120, host driver 142 sends, at step 350, a ('go ahead') message or command to memory controller 120 to make the changes logged in log 170 in storage device file system 112.

At step 360, which corresponds to step 280 in FIG. 2, host driver 142 receives a notification from memory controller 120 that it changed storage device file system 112 in storage device 100. Then, at step 370, host driver 142 updates file system representation 152 based on information that it requests and receives from memory controller 120, which pertains to the change(s) made by memory controller 120 in storage device file system 112.

Figure 4:
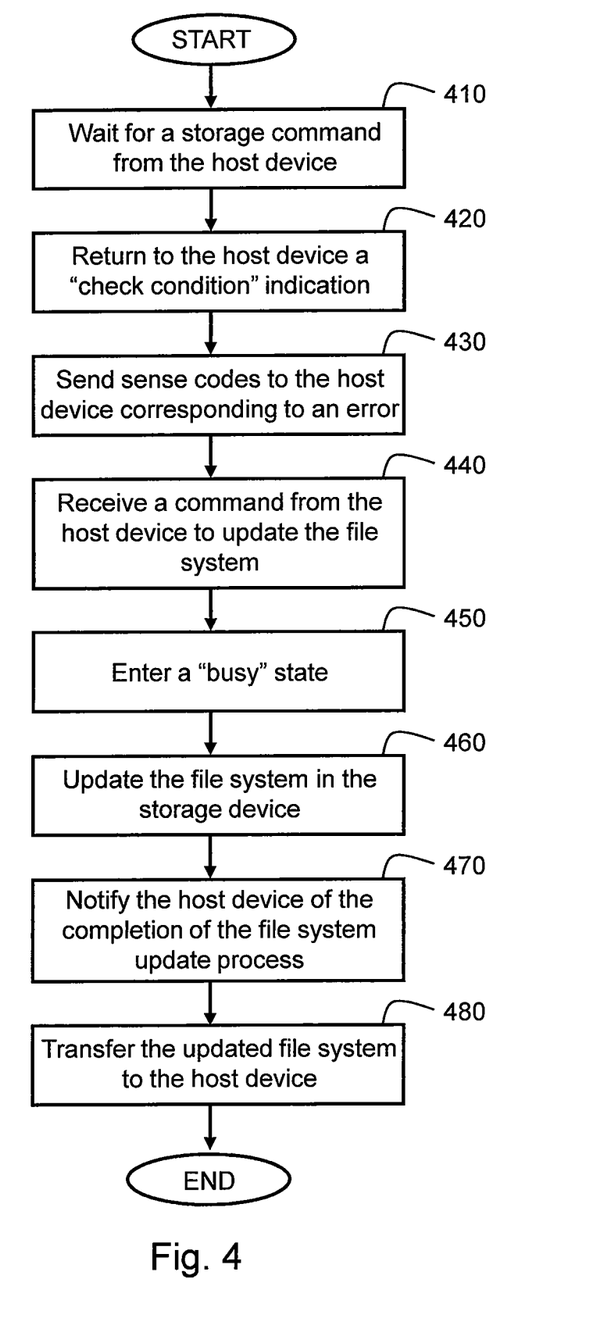
FIG. 4 is a method for synchronizing a storage device file system when a storage device and a host device use a SCSI interface and a SCSI protocol.

FIG. 4 is a method for synchronizing file systems when storage device 100 and host device 140 use SCSI interface and SCSI protocol. FIG. 4 will be described in association with FIG. 1. Small computer system interface ("SCSI") standards define commands, protocols, and electrical and optical interfaces for physically connecting and transferring data between computers and peripheral devices. SCSI can be used to connect a wide range of devices, for example storage device 100 and host device 140. Assume that log 170 contains changes that have to be made in the storage device file system.

At step 410, storage device 100 waits to receive a command (e.g., memory sector read or write) from host device 140. Upon receiving the command, storage device 100 executes the command and, then, returns to host device 140, at step 420, a "check condition" indication that indicates to host device 140 that a potential error condition occurred.

Responsive to host device 140 receiving the "check condition" indication, host device 140 gets from storage device 100, at step 430, a "sense code" corresponding to the error condition, and another sense code that indicates that, while the command was successfully executed, storage device 100 has initiated changes in the storage device file system, and that these changes are currently pending. The two SCSI sense codes mentioned above are unconventional codes (i.e., they are new types of codes).

In the SCSI scheme, a "SCSI Status Code" is used to determine the success or failure of a SCSI command. At the end of a command, the target device (e.g., storage device 100) returns a Status Code byte which can conventionally be, for example, "00h OK" ("h" means "hexadecimal"), which indicates that the device (e.g., storage device 100) has completed the task successfully; "02h Check condition", which is an indication from the target that an error occurred when it attempted to execute a SCSI command, etc. The initiator (e.g., host device 140) usually issues a SCSI Request Sense command in order to obtain a Key Code Qualifier ("KCQ") from the target device. Key Code Qualifier (KCQ) is a computer term used to describe an error-code that is returned by a SCSI device. When a SCSI target device returns a "check condition" in response to a command, the initiator usually issues a SCSI Request Sense command. The target device responds to the Request Sense command with a set of SCSI sense data that contain information about the error (i.e., sense key, sense code (ASC), and sense code qualifier (ASCQ)).

The process of returning a "check condition" indication to host device 140 and getting sense codes from storage device 100 may be repeated for each successive read/write command until host device 140 sends to storage device 100, at step 440, a "commit file system changes" command, which is a new type of SCSI command (i.e., it is an unconventional SCSI command).

Responsive to storage device 100 receiving the commit file system changes command from host device 140, storage device 100 enters, at step 450, a "busy" state, as it is occupied making the change or changes, and sends a "busy" message to host device 140 prior to or while updating the storage device file system with the pending change(s). Storage device 100 may send the "busy" message to host device 140 intermittently or each time host device 140 sends a command to storage device 100 and memory controller 120 has not yet finished making the changes logged in log 170 in the storage device file system. With respect to the SCSI scheme, the target (a storage device such as storage device 100) enters a "busy" state (SCSI status code "08h") and returns a "busy" message if it cannot complete a command at that time, for example because it is in a condition known as the contingent allegiance condition. On a SCSI connection, a "contingent allegiance condition" occurs while a SCSI device reports an error. Other connection schemes may use SCSI-like or different methods to handle a "busy" condition and to report an error to the host device.

While in the "busy" state, storage device 100 updates the storage device file system with a pending change, defer other changes while it updates the file system with the change, and refrains from executing (i.e., it ignores) additional storage commands while the "busy" state prevails in order not to interfere with the file system updating process that is taking place in storage device 100.

While the file system updating process is in progress in storage device 100, storage device 100 writes, at step 460, all or some of the logged changes into the storage device file system in storage device 100 in sequence until the content of log 170 is fully exhausted. Memory controller 120 reviews the logged changes and, based on the review, decides which changes of all the logged changes should be written in the file system. (Note: a logged change may cancel out another change or a series of changes.) Then, memory controller 120 makes the (selected) changes in the file system according to the order at which they were logged (i.e., 'first logged first made').

Memory controller 120 may update storage device file system 112 with deferred (i.e., pending) changes according to a predetermined order of preceding changes and succeeding changes, or contingent on such changes. For example, if a first change involves writing some data in the file system and a fifth change involves deleting that data from the file system, memory controller 120 discards these changes because they cancel out each other.

After storage device 100 makes all the relevant changes in the file system, it notifies host device 140, at step 470, that the commit file system changes command was successfully executed. In response to the notification, host device 140 (i.e., host driver 142) rescans all the file system structures within storage device 100 by sending corresponding read command(s) to storage device 100. Storage device 100 responds to the read command(s) issued by host driver 142 by transferring the requested information, at step 480, to host device 140.

Memory controller 120 and/or host driver 142 can be a standard off-the-shelf System-on-Chip ("SoC") device or a System-in-Package ("SiP") device or general purpose processing unit with specialized software or application (e.g., application 112 and application 156, respectively) that, when executed by memory controller 120, or by host driver 142, performs the processes, steps, operations, and determinations described herein. Alternatively, memory controller 120 and/or host driver 142 can be an Application-Specific Integrated Circuit ("ASIC") that implements the processes, steps, operations, and determinations described herein by using hardware.

The articles "a" and "an" are used herein to refer to one or to more than one (i.e., to at least one) of the grammatical object of the article, depending on the context. By way of example, depending on the context, "an element" can mean one element or more than one element. The term "including" is used herein to mean, and is used interchangeably with, the phrase "including but not limited to". The terms "or" and "and" are used herein to mean, and are used interchangeably with, the term "and/or," unless context clearly indicates otherwise. The term "such as" is used herein to mean, and is used interchangeably, with the phrase "such as but not limited to".

Note that the foregoing is relevant to various types of mass storage devices such as memory cards, SD-driven flash memory cards, flash storage devices, "Disk-on-Key" devices that are provided with a Universal Serial Bus ("USB") interface, USB Flash Drives ("UFDs"), MultiMedia Card ("MMC"), Secure Digital ("SD"), miniSD and microSD, and so on.

Having thus described exemplary embodiments of the invention, it will be apparent to those skilled in the art that modifications of the disclosed embodiments will be within the scope of the invention. Alternative embodiments may therefore include more modules, fewer modules and/or functionally equivalent modules. Hence the scope of the claims that follow is not limited by the disclosure herein.

What is claimed is:

1. A method for updating a file system of a storage device, the method comprising:
in a host device comprising a host driver that is configured to manage a connection between the host device and a storage device connected to the host device and that is configured to manage a storage device file system of the storage device, the host driver:
receiving a notification from the storage device in response to sending a storage command to the storage device, the notification regarding a requested change in one or more values within the storage device file system that a controller of the storage device has initiated and logged in a synchronization log; and
sending a command to the storage device in response to receiving the notification that directs the storage device to make the requested change in one or more values within the storage device file system that the controller of the storage device initiated and logged in the synchronization log.

2. The method as in claim 1, further comprising the host driver updating one or more values within a representation of the storage device file system in the host device based on a change in one or more values within the storage device file system indicated in the notification.

3. The method as in claim 2, wherein to update the representation of the storage device file system, the host driver requests, and receives, information from the storage device, which pertains to the change in the one or more values within the storage device file system initiated and made by the storage device.

4. A host device connectable to a storage device, comprising:
a processor; and
a host driver running on the processor, the host driver configured to manage a connection with a storage device, configured to perform changes in a storage device file system of the storage device, and configured to perform changes in a representation of the storage device file system in the host device,
wherein the host driver is further configured to:
receive a notification from the storage device in response to sending a storage command to the storage device, the notification regarding a requested change in one or more values within the storage device file system that a controller of the storage device has initiated and logged in a synchronization log; and
send a command to the storage device in response to receiving the notification that directs the storage device to make the requested change in one or more values within the storage device file system that the controller of the storage device initiated and logged in the synchronization log.

5. The host device as in claim 4, wherein the host driver is further configured to update one or more values within the representation of the storage device file system in the host device based on a change in one or more values within the storage device file system indicated in the notification.

6. The host device as in claim 5, wherein the host driver is further configured to request, and consequently to receive, information from the storage device, which pertains to the change in the one or more values within the storage device file system initiated and made by the storage device.

7. The method as in claim 1, further comprising the host driver receiving a check condition indication from the storage device.

8. The method as in claim 1, further comprising the host driver receiving a sense code from the storage device corresponding to an error.

9. The method as in claim 1, further comprising the host driver receiving a notification from the storage device of completion of updating the storage device file system.

10. The host device as in claim 4, wherein the host driver is further configured to receive a check condition indication from the storage device.

11. The host device as in claim 4, wherein the host driver is further configured to receive a sense code from the storage device corresponding to an error.

12. The host device as in claim 4, wherein the host driver is further configured to receive a notification from the storage device of completion of updating the storage device file system.

13. A host device comprising:
means for receiving a notification from a storage device in response to sending a storage command to the storage device, the notification regarding a requested change in one or more values within a storage device file system that a controller of the storage device has initiated and logged in a synchronization log; and
means for sending a command to the storage device in response to receiving the notification that directs the storage device to make the requested change in one or more values within the storage device file system that the controller of the storage device initiated and logged in the synchronization log.

14. The host device as in claim 13, further comprising means for updating one or more values within a representation of the storage device file system in the host device based on a change in one or more values within the storage device file system indicated in the notification.

15. The host device as in claim 14, further comprising means for requesting and receiving information from the storage device, which pertains to the change in the one or more values within the storage device file system initiated and made by the storage device.

16. The host device as in claim 13, further comprising means for receiving a check condition indication from the storage device.

17. The host device as in claim 13, further comprising means for receiving a sense code from the storage device corresponding to an error.

18. The host device as in claim 13, further comprising means for receiving a notification from the storage device of completion of updating the storage device file system.

19. The host device as in claim 13, wherein the means for receiving and the means for sending comprise a processor.

20. The host device as in claim 19, wherein the processor is configured to run a host driver.

* * * * *